United States Patent [19]

Park

[11] Patent Number: 5,407,307

[45] Date of Patent: Apr. 18, 1995

[54] DOWELING JIG

[76] Inventor: Joon Park, 1320 Virginia Ave., Glendale, Calif. 91202

[21] Appl. No.: 187,901

[22] Filed: Jan. 28, 1994

[51] Int. Cl.⁶ .............................................. B23B 47/28
[52] U.S. Cl. .................................. 408/115 R; 408/108
[58] Field of Search .............. 408/97, 103, 108, 115 R

[56] References Cited

U.S. PATENT DOCUMENTS

| | | | |
|---|---|---|---|
| 2,470,038 | 5/1949 | Long | 408/115 R |
| 2,602,238 | 7/1952 | Wellman | 408/115 R |
| 2,710,454 | 6/1955 | Kershaw . | |
| 3,674,376 | 2/1971 | Silken . | |
| 3,918,165 | 11/1975 | Czernik et al. . | |
| 4,176,989 | 12/1979 | Wolff | 408/115 R |
| 4,421,442 | 12/1983 | Lindblad | 408/115 R |
| 4,752,162 | 6/1988 | Iroh | 408/115 R |

FOREIGN PATENT DOCUMENTS 2092488  8/1982  United Kingdom ............ 408/115 R

*Primary Examiner*—Daniel W. Howell

[57] ABSTRACT

A doweling jig for mounting workpieces together by one or more of the three major doweling operations: 1. edge-to-edge, 2. edge-to-end, and 3. edge-to-surface. The doweling jig is a clamp type, which is comprised of two clamping jaw and drill guide assemblies. Each clamping assembly consists of a clamping face, an end face, and drill guides. The upper assembly has alignment slots, which increase the jig's capability to items 2. and 3. as referenced above. The said drill guide centers are fixed with respect to the clamping face and the end face, whereby both faces are utilized as a reference/gauging surface for positioning of said drill guides. Both clamping assemblies are movable and guided by rods with respect to each other via a thrust screw assembly.

4 Claims, 3 Drawing Sheets

DOWELING JIG

FIELD OF THE INVENTION

This invention relates to doweling jigs and more particularly to doweling jigs that facilitate the generation of accurately drilled dowel receiving holes to workpieces scheduled to be joined in a butting-edge to butting-edge relation, an end-to-face relation, or a surface-to-face relation.

BACKGROUND OF THE INVENTION

The term "prior art" is used to describe related art that has an effective date prior to the current date of filing and has no further connotation. The prior art as described in U.S. Pat. No. 4,421,442 is a related clamp-type doweling jig that is limited to edge-to-edge doweling operations and does not accommodate end-to-face and surface-to-face doweling operations. The prior art as described in U.S. Pat. No. 4,602,898 has the capability to accommodate edge-to-edge, end-to-face, and surface-to-face doweling operations with a cumbersome sequence of set-up procedures that departs from the intent of the present invention. Further, the gauging operation for the edge-to-surface doweling operation relies on approximation when referencing from the surfaces of the workpieces. The present invention accommodates edge-to-edge, end-to-face, and surface-to-face doweling operations with no set-up required. Further, all gauging and referencing procedures for the subsequent generation of dowel receiving holes are accurate and provide flush mounting surfaces after the doweling operations are completed.

SUMMARY OF INVENTION

It is an object of this invention to provide a unique doweling jig that provides accurate drill guide placement for the subsequent generation of dowel receiving holes for all three major doweling operations: 1) edge-to-edge, 2) edge-to-end, and 3) edge-to-surface.

It is an object of this invention to provide a preferred embodiment that is easy to use, requires no set-up, is quick in application, requires no measurements and/or calculations, yields accurately placed drill guide center locations for all three major doweling operations, and yields flush workpiece surfaces after the final doweling related assembly sequences are completed.

It is an additional object of this invention to provide a novel doweling jig that is simplified in design, is comprised of a minimum of parts, and is relatively inexpensive to manufacture so that even the infrequent user and/or home craftsman will find it affordable.

The novel doweling jig, as disclosed herein, is a clamp type, whereby an upper and lower clamping assembly move with respect to each other via a thrust screw assembly. Both the upper and the lower clamping assemblies are comprised of one or more drill guides, which are fixed. The positioning of the drill guides are at a fixed distance from the clamping face and the end face of said upper and lower clamping assemblies, whereby these surfaces are used as a reference for accurate drill guide positioning when gauging off workpieces. The upper clamping assembly has the additional feature of alignment slots, which are aligned with the centerlines of the drill guides and are utilized for alignment of workpieces for edge-to-end and edge-to-surface doweling operations. Function, in the preferred embodiment, has been extended to variable workpiece stock thicknesses and dowel diameters by the utilization of shim plates on the clamping faces of the upper and lower clamping assemblies, and subsequent introduction of alternate drill guide diameters, with corresponding alternate drill guide positions, with respect to the shimmed reference surfaces on both of the assemblies.

DESCRIPTION OF THE PREFERRED EMBODIMENT

Figure 1:
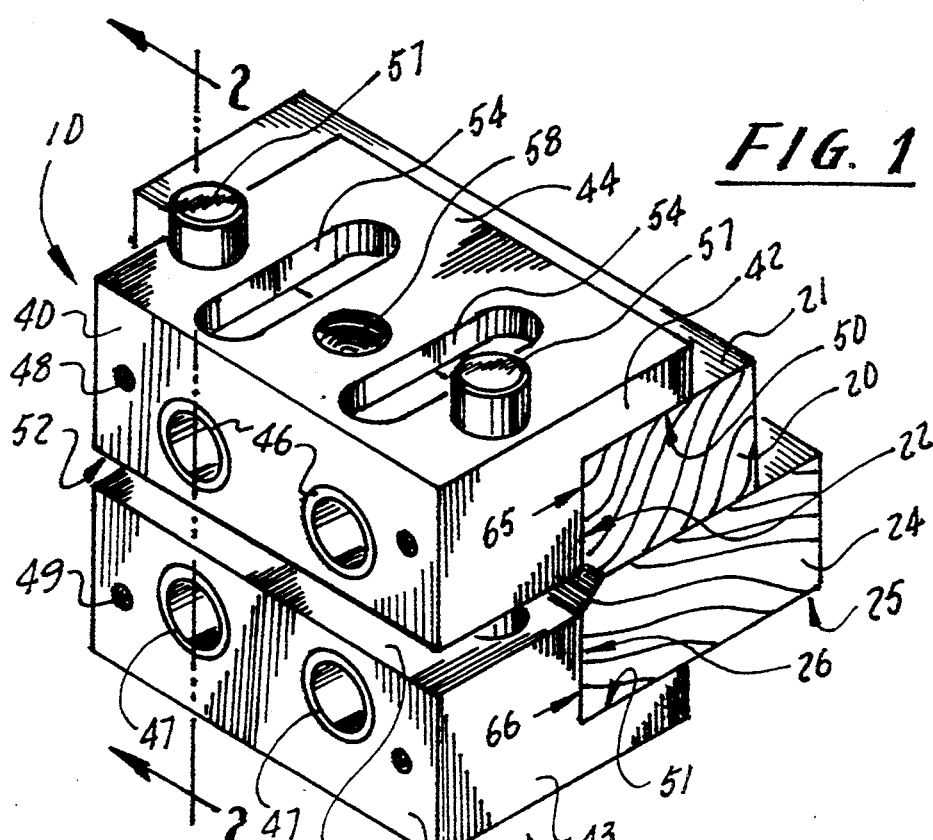
FIG. 1 is a perspective view of the preferred embodiment, as outlined herein, being utilized to drill the dowel receiving holes for an edge-to-edge doweling operation sequence, on two workpieces.
Figure 3:
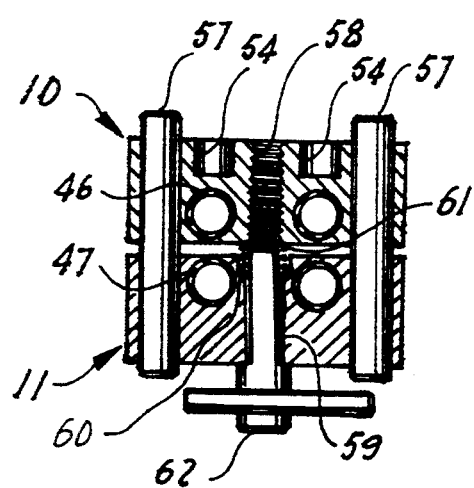
FIG. 3 is a sectional view of the doweling jig shown in FIG. 1 and FIG. 2 taken along line 3—3 of FIG. 2.

Referring now by the characters of reference to the drawings and first to FIG. 1, it is apparent that the preferred embodiment is comprised of an upper clamping assembly 10, and a lower clamping assembly 11, whereby the two are joined by a thrust screw assembly 62, which engages the upper clamping assembly 10 by a thread hole 58 and passes through the lower clamping assembly 11 via a clearance hole 59 as shown in FIG. 3. In FIG. 3 a spring recess 60 is shown, whereby spring 61 is installed to provide resistance to the thrust screw assembly 62 by a separation force between the upper and lower clamping assemblies 10 and 11. Clamp shafts 57 act as guide slides between the upper and lower clamping assemblies 10 and 11 during tightening, loosening, and clamping operations, and are retained via the set screws 48 and 49.

Figure 2:
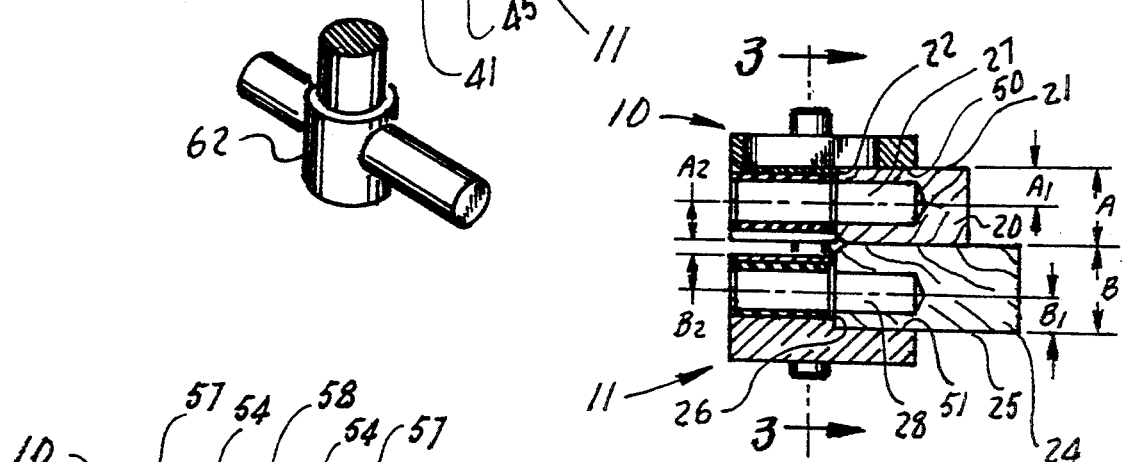
FIG. 2 is a sectional view of the doweling jig and workpieces of FIG. 1 taken along line 2—2 of FIG. 1.
Figure 4:
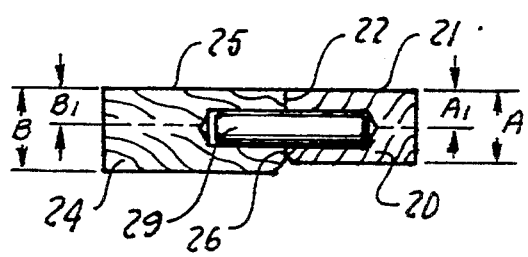
FIG. 4 is a sectional view of the workpieces shown in FIG. 1 and FIG. 2, after the completion of the edge-to-edge doweled butt joint assembly sequence.

In FIG. 1, clamping face 50 is butted against surface 21 of a board 20, and butting edge 22 is butted against edge 65 of the board 20. Clamping face 51 is butted against surface 25 of the board 24, and butting edge 26 is butted against edge 66 of the board 24. As shown in FIG. 2, drill guides 46 are positioned on edge 22 and are ready for utilization to generate dowel receiving holes 27. Drill guides 47 are positioned on edge 26 and are ready to be utilized for the generation of dowel receiving holes 28. FIG. 2 also shows the spacing dimensions with respect to the centerlines of said drill guides 46 & 47. The spacing for drill guides 46, from clamping face 50 and end face 52, are defined by $A_1$ and $A_2$ as follows: $A_1=A_2$ but $A_1+A_2 \neq A$. For example, for a board thickness of $\frac{3}{4}$ inch for board 20, $A_1=A_2=0.350$ inch, which allows for stock thickness variations of approximately $\pm 1/32$ inch from the nominal thickness of $\frac{3}{4}$ inch for the board 20, while maintaining accurate dowel receiving holes that will provide a flush doweled butt joint upon assembly as shown in FIG. 4, whereby surface 21 and 25 are flush as shown. Similarly for lower clamping assembly 11, the centerlines of drill guides 47 from clamping face 51 and end face 53 are defined by $B_1$ and $B_2$ as follows: $B_1=B_2$ but $B_1+B_2 \neq B$. For example, for a board thickness of $\frac{3}{4}$ inch for board 24, $B_1=B_2=0.350$ inch, which allows for stock thickness variations of approximately $\pm 1/32$ inch for the board 24 while maintaining accurate dowel receiving holes that will provide a flush doweled butt joint upon assembly as shown in FIG. 4, whereby surfaces 21 and 25 are flush as shown. Note that $A_1=A_2=B_1=B_2$, which provides symmetrically located dowel receiving holes in the butting edges 22 and 26. In FIG. 4, after the completion of the edge-to-edge doweled butt joint assembly, the dimensions $A_1$ and $B_1$ are shown, whereby the surfaces 21 and 25 are flush as preferred and accomplished via the preferred embodiment disclosed herein. The distance between the clamping face and the end face is less than two times the diameter of the drill bit guide.

Figure 5:
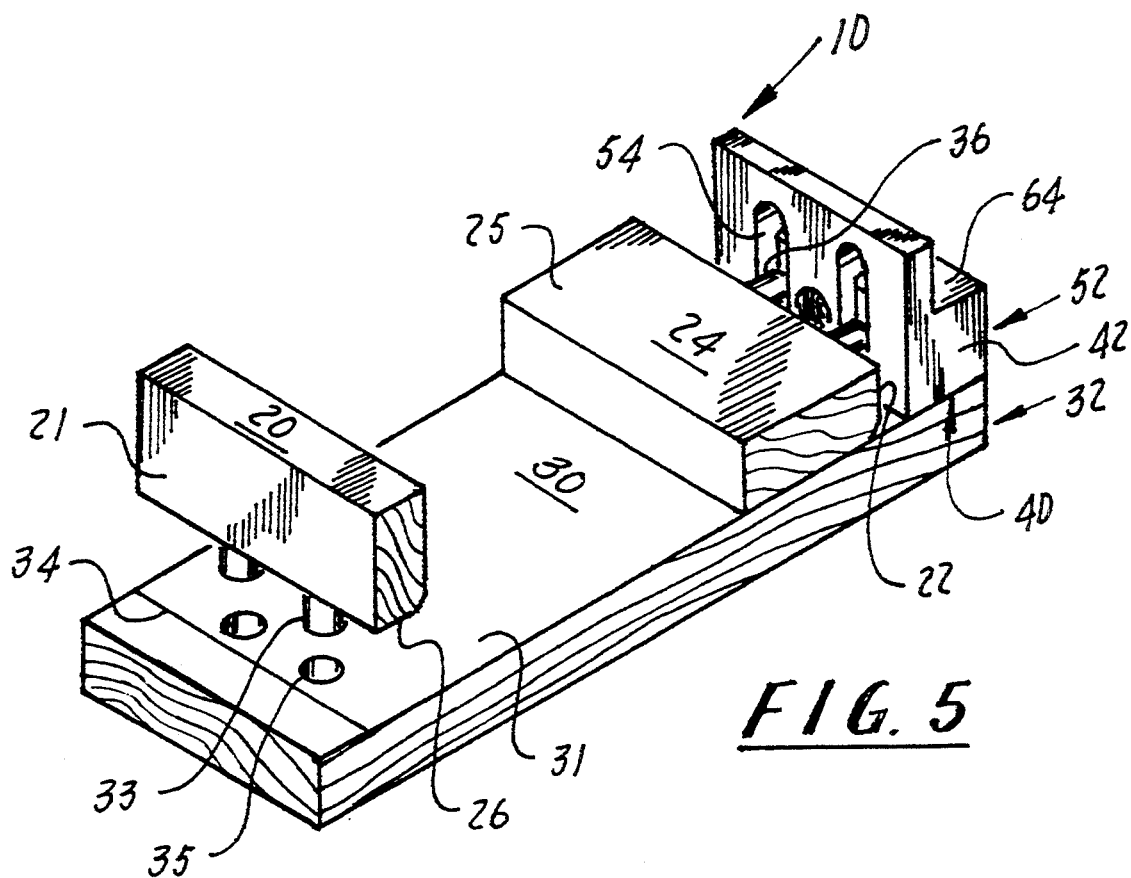
FIG. 5 is a perspective view of the preferred embodiment being used to drill dowel receiving holes for an edge-to-end doweling operation sequence. The two workpieces, as shown in FIG. 1, have been doweled and are ready for assembly into the third workpiece. The final assembly sequence for an edge-to-surface doweling operation is also shown, whereby the preferred embodiment was previously utilized to provide the two dowel receiving holes on the third workpiece.

The alignment slots 54 on the upper clamping assembly 10 are related to drill guides 46 and 47 by the centerlines and are subsequently coaxial. In FIG. 5, the upper clamping assembly 10 is oriented as shown with the board 24 with the installed dowels 36, and the workpiece 30. Dowels 36 are engaging alignment slots 54, whereby the drill guides 46 are aligned with the alignment slots 54, and the dowels 36. The drill guides 46 of upper clamping assembly 10 are ready to be utilized for the generation of the dowel receiving holes 37. End face 52 of the upper clamping assembly 10 is flush with end 32 of the workpiece 30. Recalling that $A_1=A_2=B_1=B_2$, therefore when the board 24 is assembled to the workpiece 30 via an edge-to-end doweling operation, the surface 25 of board 24 will be flush with end 32 of the workpiece 30 as preferred and accomplished via the present invention. Board 20, with installed dowels 33, is shown prior to final insertion into workpiece 30, whereby alignment line 34 is utilized as the reference plane for the end face 52 of the upper clamping assembly 10, and in a similar fashion the dowel receiving holes 35 are generated for an edge-to-surface doweled butt joint.

Figure 6:
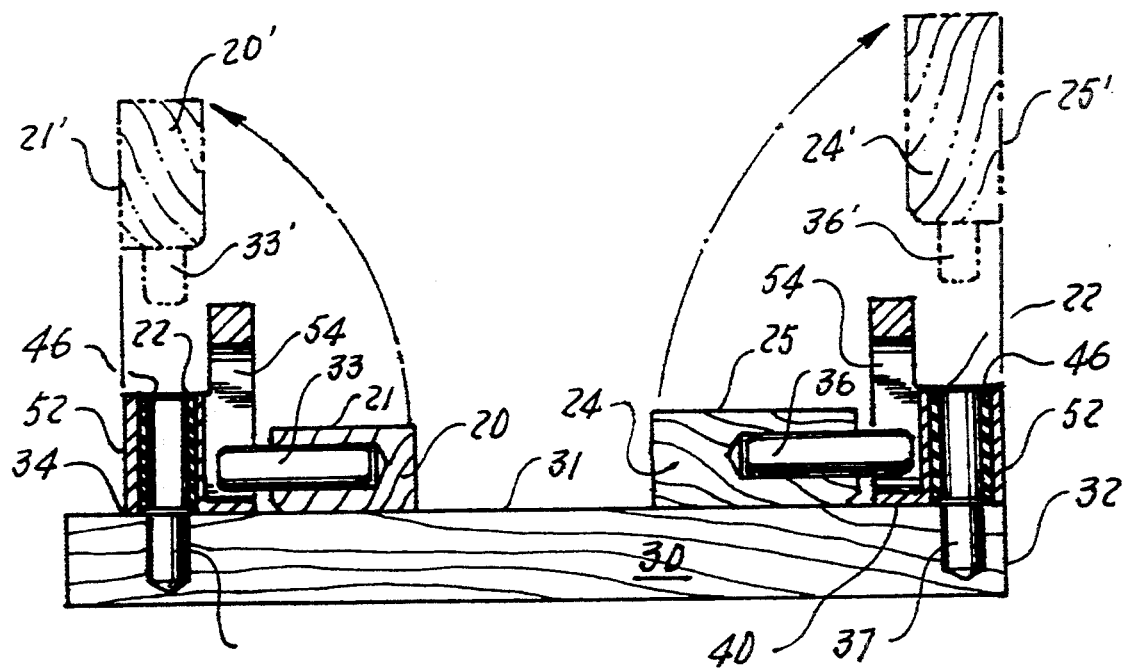
FIG. 6 is a sectional view of the preferred embodiment being used to drill dowel receiving holes for both edge-to-end and edge-to-surface doweling operations, showing the initial doweling jig alignment positions to permit the use of the previously doweled workpieces to gauge the position of the doweling jig for accurate drill guide positioning.

In FIG. 6, the position of the upper clamping assembly 10 for an edge-to-end and an edge-to-surface doweling operation is shown. Board 24, with installed dowels 36, engages upper clamping assembly 10 in alignment slots 54, thereby providing reference positioning for drill guides 46 on top surface 31 of the workpiece 30 and subsequent generation of dowel receiving holes 37. As previously outlined, end face 52 is made flush with end 32 of workpiece 30, thereby generating dowel receiving holes and subsequently an edge-to-end doweled butt joint where the surface 25 of the board 24 is flush with the end 32 of the workpiece 30 as preferred and accomplished via the present invention. The position of board 24 is shown prior to final insertion into workpiece 30 and is labeled 24' for reference. Board 20 engages upper clamping assembly 10 in alignment slots 54 via the installed dowels 33, which provide correct reference positioning for drill guides 46 on top surface 31 of workpiece 30, whereby the subsequent correct positioning, for the generation of dowel receiving holes 35, is obtained. The alignment line 34 (see FIG. 5) is used as the reference for end face 52, of the upper clamping assembly 10, whereby the desired positioning of drill guides 46 on top surface 31 of workpiece 30 is obtained for the generation of dowel receiving holes 35. The position of board 20 is shown prior to final insertion into workpiece 30 and is labeled 20' for reference.

Figure 7:
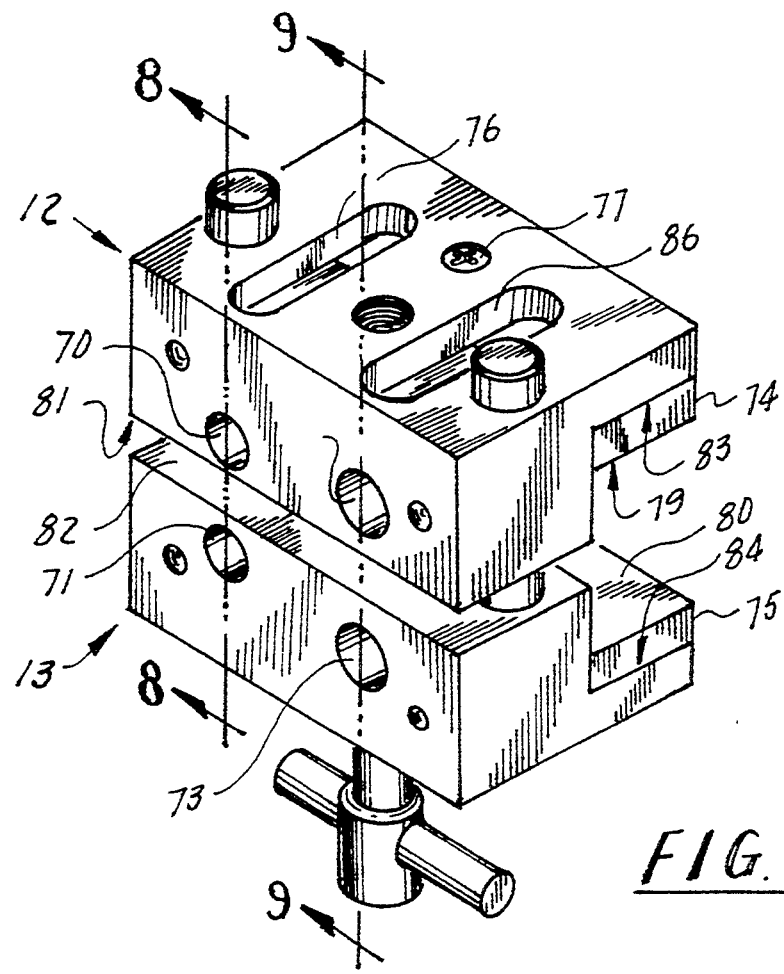
FIG. 7 is a perspective view of a versatile version of the preferred embodiment where removable shim plates have been added to the clamping faces of the upper and lower clamping assemblies to expand the doweling jigs workpiece thickness and dowel diameter processing capability.
Figure 8:
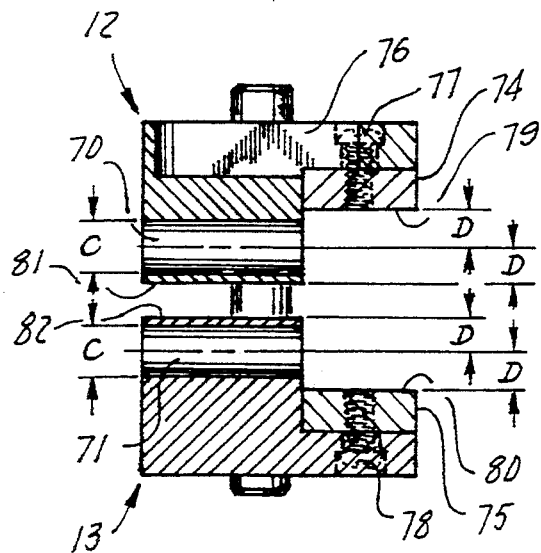
FIG. 8 is a sectional view of the doweling jig shown in FIG. 7 taken along line 8—8 of FIG. 7, whereby shim plates are installed and the corresponding set of drill guides for this condition are shown.
Figure 9:
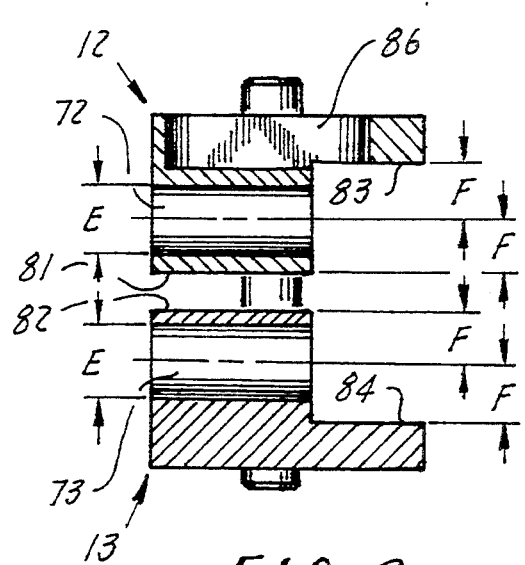
FIG. 9 is a sectional view of the doweling jig shown in FIG. 7 taken along line 9—9 of FIG. 7, whereby the doweling jig is shown with the shim plates removed from the clamping assemblies and the corresponding drill guides for this condition are shown.

In FIG. 7, an alternate version of the preferred embodiment is shown, whereby a removable shim plate is introduced into the present invention along with a separate set of alternately positioned drill guides. The overall layout of the doweling jig is as previously outlined except for the differences outlined herein. The original preferred embodiment shown in FIG. 1 will be fabricated with a soft material such as aluminum, whereby the drill guides will be made of hardened steel bushings. The alternate version, as outlined herein, will consist of an upper and lower clamping assembly made of a hardened ferrous steel, whereby the necessity for hardened steel bushings will be eliminated. As an example, the drill guide holes 70 and 71 would be $\frac{1}{4}$ inch or 5/16 inch diameter, and doweling jig processing capability would be extended to a stock board thickness of $\frac{1}{2}$ inch or higher from the original stock thickness capability of the preferred embodiment shown in FIG. 1. The upper clamping assembly 12 has a shim plate 74 attached with fastener 77 and an alternate drill guide hole 70, whereby the diameter is $\frac{1}{4}$ inch or 5/16 inch, which is located with respect to shim clamping face 79 of shim plate 74 by dimension D, whereby D=0.225 inch, for this example. As shown in FIG. 8, the end face 81 and the shim clamping face 79 are equidistant from the centerline of drill guide 70, of diameter C, by the dimension D. In the lower clamping assembly 13, shim plate 75 is fastened by fastener 78, and an alternate drill guide hole 71 of $\frac{1}{4}$ inch or 5/16 inch diameter, for this example, is located with respect to the shim clamping face 80 of shim plate 75 by dimension D, whereby D=0.225 inch as previously outlined for the upper clamping assembly 12. As shown in FIG. 8, the end face 82 and the shim clamping face 80 are equidistant from the centerline of drill guide hole 71, of diameter C, by dimension D. In FIG. 9 the condition when the shim plates 74 & 75 have been removed from the upper clamp assembly 12 and the lower clamp assembly 13 is shown. For the upper clamping assembly the drill guide hole 72, of diameter E, is equidistant from clamping face 83 and end face 82 by the dimension F, where for this example, F=0.350 inch for doweling jig processing capability for board stock thicknesses of $\frac{3}{4}$ inch or thicker, for this example. For the lower clamping assembly 13, drill guide hole 73, of diameter E, is equidistant from clamping face 84 and end face 82 by the dimension F, where F=0.350 inch for a minimum board stock thicknesses of ¾ inch, for this example. The width of the alignment slot 76 is equal to the diameter of the drill guide hole 70, and the width of alignment slot 86 is equal to the diameter of the drill guide hole 72.

The application of the present invention may be extended beyond what is outlined in the present disclosure by those skilled in related art. The construction of the preferred embodiment may be modified without departing from the scope of the claims. All matter contained in the above description and shown in the accompanying drawings is for illustrative purposes only and should not be interpreted in a limiting sense.

I claim:

1. A doweling jig for aligning a drill bit with respect to a pair of workpieces to drill dowel receiving holes in each of the pair of workpieces, whereby the pair of workpieces may be joined by a dowel in a butting edge-to-butting edge joint, each of the pair of workpieces has a butting edge and a surface, whereby a third workpiece may be joined by a dowel variously with one of the pair of workpieces in an end-to-edge or surface-to-edge joint, said doweling jig comprising:

a) first and second clamping assemblies, each of said first and second clamping assemblies comprising a clamping face, an end face and at least one drill bit guide, said clamping face receiving the surface of a corresponding one of the pair or workpieces, each of said drill bit guides having an axis disposed equidistant from said end face and said clamping face of its corresponding clamping assembly; and b) means for mounting said first and second assemblies for clamping the pair of workpieces between said clamping faces thereof to thereby align each of the respective butting edges of the pair of workpieces to intersect said drill bit guide axis of its corresponding one of said first and second assemblies; and c) each of said first and second clamping assemblies comprises an alignment slot having a centerline orientated in a parallel relation with said drill guide axis and within a surface of its corresponding one of said first and second assemblies on the other side of said drill bit guide remote from said end face to align dowel receiving holes in said third workpiece.

2. The doweling jig as claimed in claim 1, wherein said mounting means comprises a pair of clamp shafts aligned to be received in corresponding pair of guide openings within each of said first and second clamping assemblies, and further comprises a thrust screw for clamping said first and second clamping assemblies.

3. The doweling jig as claimed in claim 1, wherein the distance between said clamping face and said end face is less than two times the diameter of said drill bit guide.

4. The doweling jig as claimed in claim 1, wherein each of said first and second clamping assemblies comprises an attachably removable shim plate of a size and dimensions for being mounted on said clamping face of its corresponding one of said first and second clamping assemblies to permit the drilling of dowel receiving holes of different diameter into workpieces of different dimensions.

* * * * *